(12) United States Patent
English

(10) Patent No.: US 8,219,749 B2
(45) Date of Patent: Jul. 10, 2012

(54) SYSTEM AND METHOD FOR EFFICIENT UPDATES OF SEQUENTIAL BLOCK STORAGE

(75) Inventor: Robert M. English, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 804 days.

(21) Appl. No.: 11/741,553

(22) Filed: Apr. 27, 2007

(65) Prior Publication Data

US 2008/0270690 A1 Oct. 30, 2008

(51) Int. Cl.
*G06F 12/02* (2006.01)
(52) U.S. Cl. ......... 711/114; 707/752; 711/112; 711/209
(58) Field of Classification Search .................. 711/114, 711/112, 209; 707/752
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |

(Continued)

FOREIGN PATENT DOCUMENTS

EP 0 617 358 A 9/1994

(Continued)

OTHER PUBLICATIONS

"Notification of Transmittal of the International Search Report and the Written Opinion of the International Searching Authority, or the Declaraion", International Application No. PCT/US2008/011502, filed on Oct. 6, 2008, Mailing Date Jan. 15, 2009, 11 pages.

(Continued)

*Primary Examiner* — Jae Yu
(74) *Attorney, Agent, or Firm* — Cesari and McKenna, LLP

(57) ABSTRACT

A system and method enhances performance of updates to sequential block storage of a storage system. According to an aspect of the invention, a disk array of the storage system is utilized to extend write buffers of the system, thereby rendering a portion of the disk array a disk-based log. To that end, one portion of the disk array is organized into a home location array having a set of sequential home locations for disk blocks. Another portion of the disk array is organized into the disk-based log having a set of log buffers configured to store versions of disk blocks that have yet to be returned to their home locations in the home location array. In addition, non-volatile memory of the storage system is organized as an index configured to provide efficient mappings of disk blocks not yet returned to their home locations. In accordance with another aspect of the invention, a novel disk-based multi-level sort procedure is provided to establish locality among updates (write data) held in the disk-based log, thereby enabling the write data to be efficiently written to home locations on the disk array.

20 Claims, 10 Drawing Sheets

U.S. PATENT DOCUMENTS

| | | | |
|---|---|---|---|
| 4,899,342 | A | 2/1990 | Potter et al. |
| 4,916,608 | A | 4/1990 | Shultz |
| 4,989,206 | A | 1/1991 | Dunphy, Jr. et al. |
| 5,124,987 | A | 6/1992 | Milligan et al. |
| 5,129,088 | A | 7/1992 | Auslander et al. |
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,426,747 | A | 6/1995 | Weinreb et al. |
| 5,485,579 | A | 1/1996 | Hitz et al. |
| 5,511,177 | A | 4/1996 | Kagimasa et al. |
| 5,568,629 | A | 10/1996 | Gentry et al. |
| 5,581,724 | A | 12/1996 | Belsan et al. |
| 5,764,972 | A | 6/1998 | Crouse et al. |
| 5,802,366 | A | 9/1998 | Row et al. |
| 5,819,292 | A | 10/1998 | Hitz et al. |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,061,770 | A | 5/2000 | Franklin |
| 6,081,875 | A | 6/2000 | Clifton et al. |
| 6,128,627 | A | 10/2000 | Mattis et al. |
| 6,148,368 | A * | 11/2000 | DeKoning ............ 711/113 |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 | 5/2001 | Schneider et al. |
| 6,341,341 | B1 | 1/2002 | Grummon et al. |
| 6,397,311 | B1 | 5/2002 | Capps et al. |
| 6,457,021 | B1 | 9/2002 | Berkowitz et al. |
| 6,516,380 | B2 | 2/2003 | Kenchammana-Hoskote et al. |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,721,764 | B2 | 4/2004 | Hitz et al. |
| 6,732,124 | B1 | 5/2004 | Koseki et al. |
| 6,804,706 | B2 | 10/2004 | Pitts |
| 6,868,417 | B2 | 3/2005 | Kazar et al. |
| 6,978,283 | B1 | 12/2005 | Edwards et al. |
| 6,993,701 | B2 | 1/2006 | Corbett et al. |
| 7,038,058 | B2 | 5/2006 | Lee et al. |
| 7,127,577 | B2 | 10/2006 | Koning et al. |
| 7,194,597 | B2 | 3/2007 | Willis et al. |
| 7,231,412 | B2 | 6/2007 | Hitz et al. |
| 7,409,494 | B2 | 8/2008 | Edwards et al. |
| 7,590,807 | B2 | 9/2009 | McGovern et al. |
| 2001/0010070 | A1* | 7/2001 | Crockett et al. ............ 711/162 |
| 2004/0030668 | A1 | 2/2004 | Pawlowski et al. |
| 2004/0128470 | A1* | 7/2004 | Hetzler et al. ............ 711/209 |
| 2006/0026341 | A1* | 2/2006 | Lasser ............ 711/103 |
| 2006/0184587 | A1 | 8/2006 | Federwisch et al. |
| 2007/0088702 | A1 | 4/2007 | Fridella et al. |

FOREIGN PATENT DOCUMENTS

| | | |
|---|---|---|
| WO | WO-02/29575 A2 | 4/2002 |
| WO | WO 2008/133812 | 11/2008 |
| WO | WO 2009/058189 | 5/2009 |

OTHER PUBLICATIONS

"Notification of Transmittal of the International Search Report and the Written Opinion of the International Searching Authority, or the Declaration," International Filing Date: Apr. 14, 2008, International Application No. PCT/US2008/004763, Applicant: Network Applicance, Inc., Date of Mailing: Aug. 1, 2008, pp. 1-12.

Auspex Systems, LFS—A Local File System for Multiprocessor NFS Network Servers, 1994, 6 pages.

Chutani, Sailesh, et al., The Episode File System, In Proceedings of the USENIX Winter 1992, 18 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. And Computer Sciences, Univ. of CA, presented at Summer '90 USENIX Technical Conference, Anaheim, CA Jun. 1990, 16 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

* cited by examiner

SYSTEM AND METHOD FOR EFFICIENT UPDATES OF SEQUENTIAL BLOCK STORAGE

FIELD OF THE INVENTION

The present invention relates to storage systems and, more specifically, to enhancing performance of updates to sequential block storage of a storage system.

BACKGROUND OF THE INVENTION

Disks, by their nature, are more efficient at sequential, localized transfers than at small, random transfers. A constant challenge in the disk storage industry is to develop a system, e.g., a storage system, which can perform both random write operations and sequential read operations, efficiently. As used herein, a storage system is a computer that provides storage services relating to the organization of information on writeable persistent storage, such as non-volatile memories and disks. The storage system may include a storage operating system that implements a virtualization system to logically organize the information as a hierarchical structure of data containers, such as files and logical units (luns), on, e.g., one or more arrays of disks. Each "on-disk" data container may be implemented as set of data structures, e.g., disk blocks, configured to store information, such as the actual data for the container.

The virtualization system of the storage system may be abstracted through the use of a database management system, a volume manager or a file system. A conventional log-structured file system such as, e.g., a write anywhere file system, can convert a random stream of write operations, e.g., write data, into sequential disk transfers, but in the process, can randomize locations of blocks on disk and make subsequent sequential read operations generally inefficient. On the other hand, a conventional disk array approach, such as a standard Redundant Array of Independent (or Inexpensive) Disks (RAID), typically employs a static layout that maps externally-received, sequential addresses into sequential locations on disk. This approach provides good sequential read performance, but poor random write performance.

Conventional disk array systems often compensate for poor write performance by implementing large write buffers. These write buffers are typically implemented in non-volatile memory, given its persistency and ability to maintain write data (updates) in light of a system failure. With sufficiently large write buffers, these systems can achieve higher performance by optimizing the sequence of disk updates across a large pool of potential write "candidates". However, the relative expense of maintaining large write buffers and protecting them against data loss due to system or power failures limits the size of the buffers and the efficiency gains that can be achieved.

SUMMARY OF THE INVENTION

The present invention overcomes the disadvantages of the prior art by providing a system and method for enhancing performance of updates to sequential block storage of a storage system. According to an aspect of the invention, a disk array of the storage system is utilized to extend write buffers of the system, thereby rendering a portion of the disk array a disk-based log. To that end, one portion of the disk array is organized into a home location array having a set of sequential home locations for disk blocks. Another portion of the disk array is organized into the disk-based log having a set of log buffers configured to store versions of disk blocks that have yet to be returned to their home locations in the home location array. In addition, non-volatile memory of the storage system is organized as an index configured to provide efficient mappings of disk blocks not yet returned to their home locations. That is, the non-volatile memory index provides mappings from home addresses on the home location array to log buffer addresses on the disk-based log.

In accordance with another aspect of the invention, a novel disk-based multi-level sort procedure is provided to establish locality among updates (write data) held in the disk-based log, thereby enabling the write data to be efficiently written to home locations on the disk array. As the write data is received, a log manager of the storage system temporarily stores the data efficiently on the disk-based log. As more write data arrives, the log manager sorts the data in the log in accordance with the multi-level sort procedure, thus increasing the locality of data when stored on the home location array. When the log approaches capacity, the log manager writes the sorted data to their home addresses on the array with high locality and performance.

Advantageously, the present invention eliminates the cost associated with maintaining large write buffers in a storage system by providing a disk-based log. The invention further employs a disk-based sorting procedure that sorts blocks of data held in the log prior to returning them to their home locations, thereby substantially improving locality of disk access and, therefore, disk update performance efficiency compared to conventional static disk arrays.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
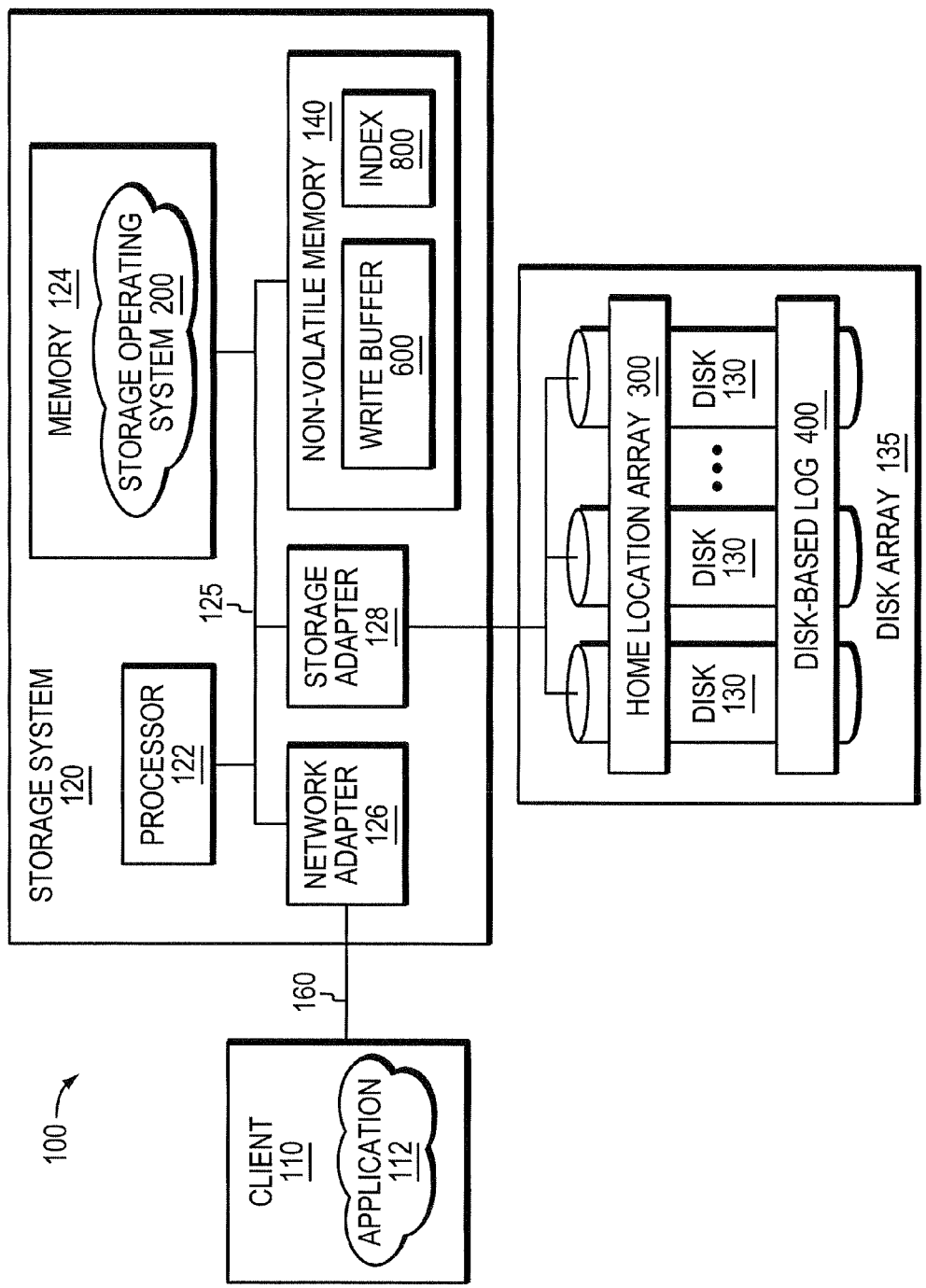
FIG. 1 is a schematic block diagram of an environment including a storage system that may be advantageously used with the present invention.

FIG. 1 is a schematic block diagram of an environment 100 including a storage system that may be advantageously used with the present invention. The storage system 120 is a computer that provides storage services relating to the organization of information on writable persistent storage devices, such as disks 130 of disk array 135. To that end, the storage system 120 comprises a processor 122, a memory 124, a network adapter 126, a storage adapter 128 and non-volatile memory 140 interconnected by a system bus 125. The storage system 120 also includes a storage operating system 200 that implements a virtualization system to logically organize the information as a hierarchical structure of data containers, such as files and logical units (luns), on the disks 130.

The memory 124 comprises storage locations that are addressable by the processor and adapters for storing software programs and data structures associated with the embodiments described herein. The processor and adapters may, in turn, comprise processing elements and/or logic circuitry configured to execute the software programs and manipulate the data structures. The storage operating system 200, portions of which is typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the inventive technique described herein.

The non-volatile memory 140 provides a temporary, yet persistent, storage space capable of maintaining write data (updates) in light of a failure to the storage system. Accordingly, the non-volatile memory 140 may be embodied as a large-volume, solid-state random access memory array having either a back-up battery, or other built-in last-state-retention capabilities (e.g. a FLASH memory), that holds the last state of the memory in the event of any power loss to the array. As described herein, the non-volatile memory is organized as a write buffer 600 and an index 800.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. That is, the client may request the services of the storage system, and the system may return the results of the services requested by the client, by exchanging packets over the network 160. The clients may issue packets including file-based access protocols, such as the Common Internet File System (CIFS) protocol or Network File System (NFS) protocol, over TCP/IP when accessing information in the form of files. Alternatively, the client may issue packets including block-based access protocols, such as the Small Computer Systems Interface (SCSI) protocol encapsulated over TCP (iSCSI) and SCSI encapsulated over FC (FCP), when accessing information in the form of blocks.

The storage adapter 128 cooperates with the storage operating system 200 executing on the storage system to access information requested by the client. The information may be stored on the disks 130 of the disk array 135 or other similar media adapted to store information. The storage adapter includes input/output (I/O) interface circuitry that couples to the disks 130 over an I/O interconnect arrangement, such as a conventional high-performance, Fibre Channel serial link topology. The information is retrieved by the storage adapter and, if necessary, processed by the processor 122 (or the adapter 128) prior to being forwarded over the system bus 125 to the network adapter 126, where the information is formatted into a packet and returned to the client 110.

In an illustrative embodiment described herein, the disk array 135 is organized into a home location array 300 and a disk-based log 400. The disks 130 of the array are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-5 level implementation, although it should be understood that other types and levels of RAID implementations, as well as other forms of redundancy, may be used in accordance with the inventive principles described herein.

Figure 2:
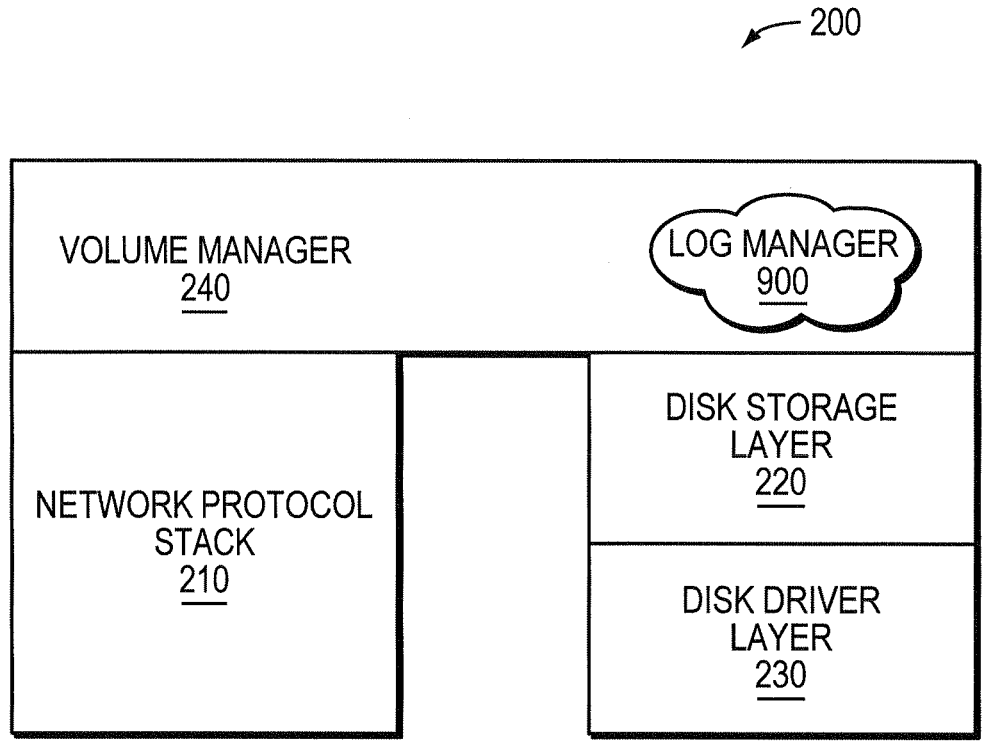
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers, including a network driver layer (e.g., an Ethernet driver), a network protocol layer (e.g., an Internet Protocol layer and its supporting transport mechanisms, the Transport Control Protocol layer and the User Datagram Protocol layer), as well as a file system protocol server layer (e.g., a CIFS server, a NFS server, etc.) organized as a network protocol stack 210. In addition, the storage operating system 200 includes a disk storage layer 220 that implements a disk storage protocol, such as a RAID protocol, and a disk driver layer 230 that implements a disk access protocol such as, e.g., a Small Computer Systems Interface (SCSI) protocol. Note that the disk storage layer 220 may alternatively be implemented as a RAID system module and embodied as a separate hardware component, such as a disk controller.

Bridging the disk software layers with the network and file system protocol layers is a virtualization system that may be abstracted through the use of a database management system, a file system or, as described herein, a volume manager 240. The volume manager 240 is illustratively a message-based system that provides logical volume management capabilities for use in access to the information stored on the storage devices, such as non-volatile memory 140 and disks 130. That is, the volume manger 240 provides functions such as (i) aggregation of the disks, (ii) aggregation of storage bandwidth of the disks, and (iii) reliability guarantees, such as mirroring and/or parity (RAID).

A log manager 900 is configured to implement a novel sort procedure described herein and, to that end, is further configured to manage the disk-based log 400, as well as the temporary, persistent storage space of the non-volatile memory 140 in accordance with the present invention. In an illustrative embodiment, the log manager 900 is embodied as a process of the volume manager 240, although it will be apparent to those skilled in the art that the log manager 900 can be implemented as a process of the disk driver layer 230, an application program, or any other specialized log management software of the storage operating system 200.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention is directed to a system and method for enhancing performance of updates to sequential block storage of a storage system. According to an aspect of the invention, disk array 135 of the storage system 120 is utilized to extend write buffers 600 of the system, thereby rendering a portion of the disk array the disk-based log 400. To that end, one portion of the disk array is organized into a home location array 300 having a set of sequential home locations for disk blocks. Another portion of the disk array is organized into the disk-based log 400 having a set of log buffers configured to store versions of disk blocks that have yet to be returned to their home locations in the home location array. In addition, non-volatile memory 140 of the storage system is organized as an index 800 configured to provide efficient mappings of disk blocks not yet returned to their home locations. That is, the non-volatile memory index provides mappings from home addresses on the home location array to log buffer addresses on the disk-based log.

Home Location Array

Figure 3:
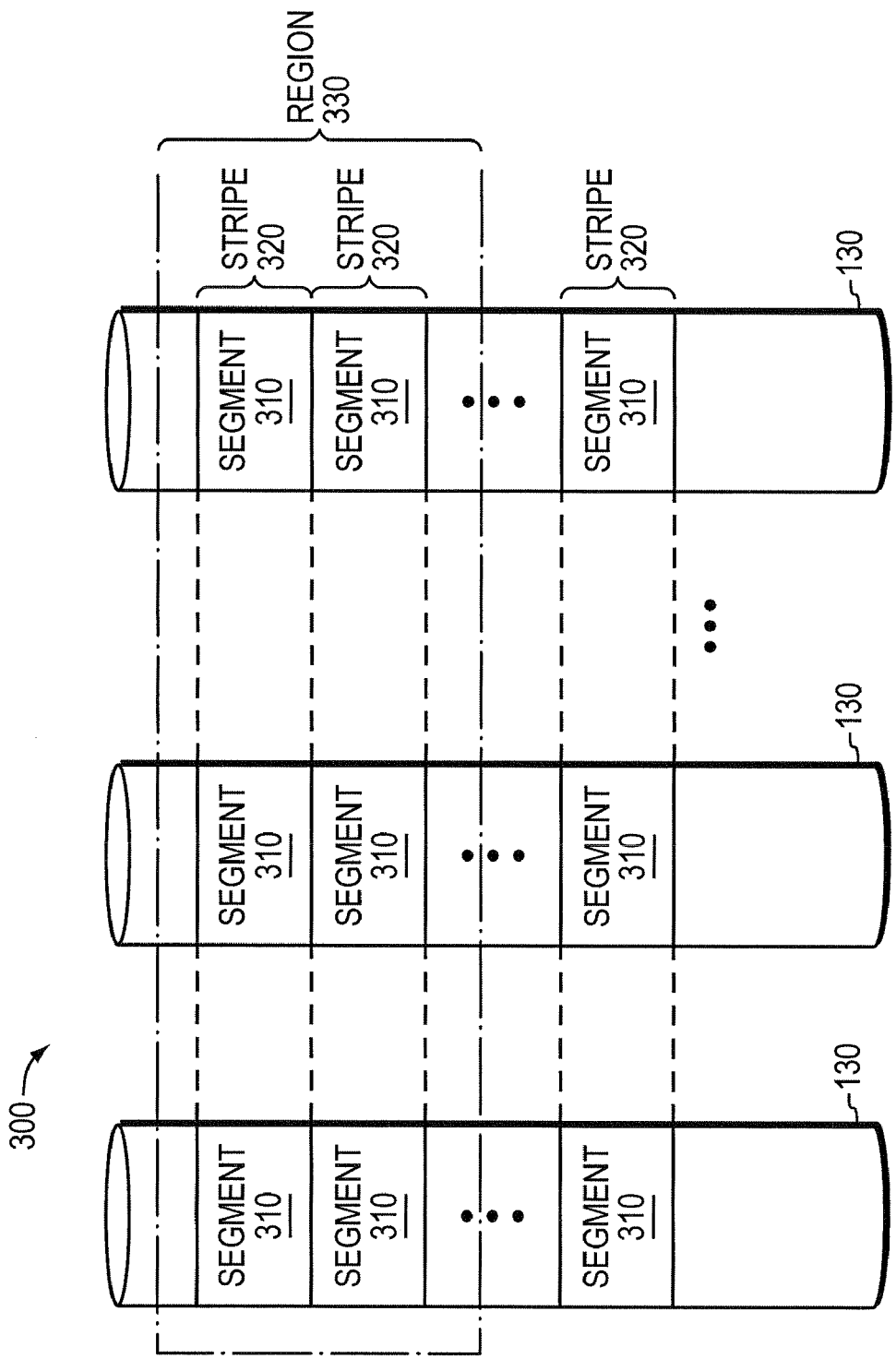
FIG. 3 is a schematic block diagram illustrating organization of a home location array in accordance with the present invention.

FIG. 3 is a schematic block diagram illustrating organization of the home location array 300 in accordance with the present invention. Each disk 130 of disk array 135 is partitioned into disjoint (i.e., non-overlapping) segments 310, with each segment containing a sequence of disk addresses. The disk addresses are illustratively 32-bit integers and each disk address illustratively corresponds to 4 kB of disk storage. However, it will be understood to those of skill in the art that other disk address and block storage sizes may be used herein.

The home location segments 310 on different disks 130 are organized into stripes 320, with each stripe containing a sequence of disk addresses. Note that the addresses of the segments 310 forming a stripe 320 do not have to assume the same positional locations on each disk 130, e.g., as in the case of a horizontal stripe, although such an arrangement is simpler to organize than, e.g., a diagonal stripe. However, the segment addresses of a stripe are configured to share parity or redundancy information. That is, each stripe has associated redundancy information, parity in the case of a RAID array or redundant copies in the case of mirroring.

Stripes 320 adjacent to one another on disks 130 are organized into regions 330. As with segments and stripes, regions 330 consist of a sequence of disk addresses. Because the disk addresses within regions 330, stripes 320, and segments 310 are dense, locality of disk address implies close physical locality and enables efficient data transfer. Note that, as a result of the disk-based sort procedure within the log (as described further herein), logged blocks are close together in their addresses when the time comes to write them back to their home locations. Those blocks are thereafter written back to their home locations on disk as "locality sets" of blocks having very small address ranges. Since the disks are organized such that closeness of address means physical locality on disk, the locality sets of blocks written to their home locations have high physical locality on disk and RAID updates are efficient. These locality sets may span stripes 320 but are preferably within a region 330 or a small number of regions.

Disk-based Log

Figure 4:
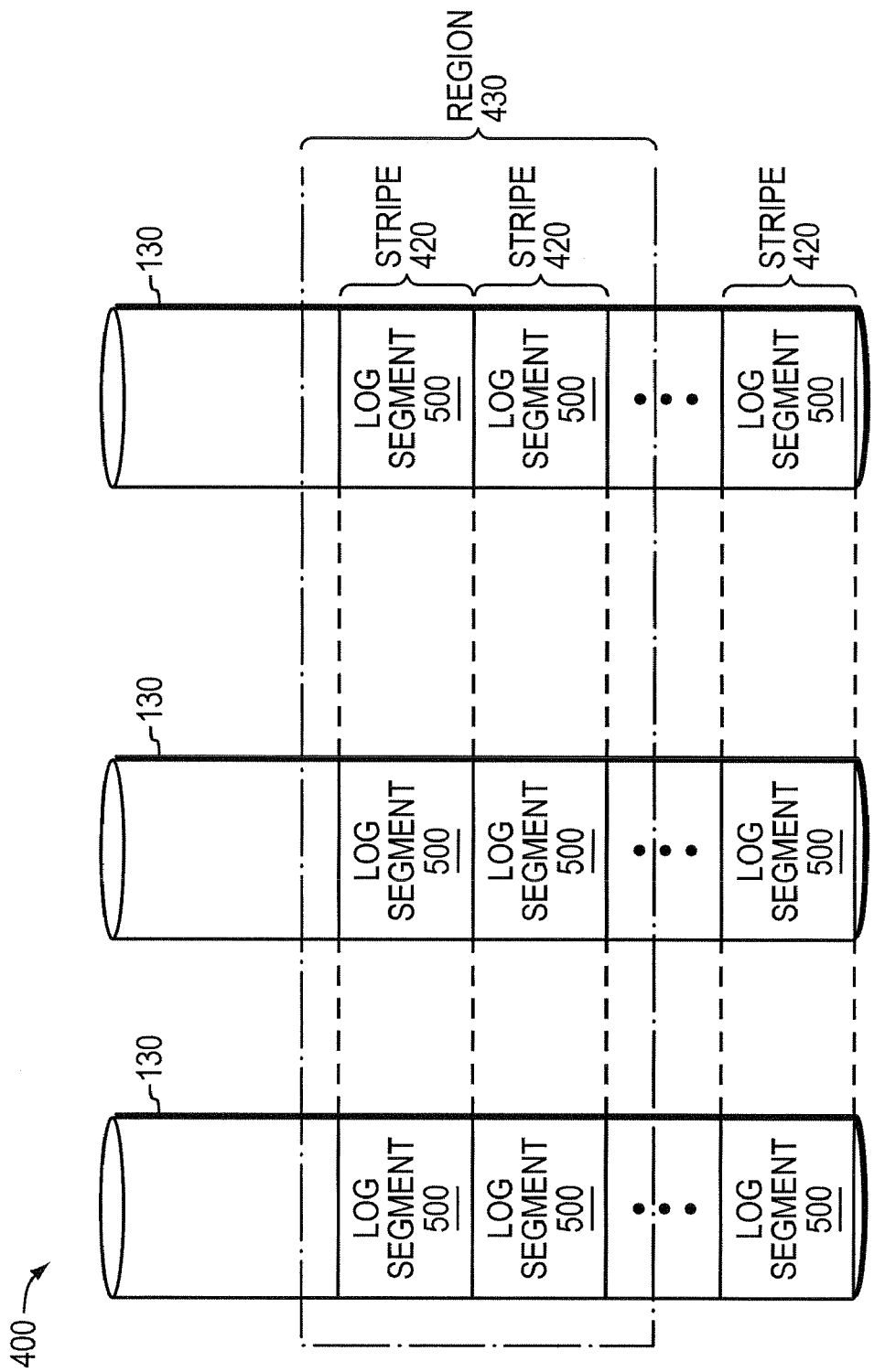
FIG. 4 is a schematic block diagram illustrating organization of a disk-based log in accordance with the invention.

FIG. 4 is a schematic block diagram illustrating organization of the disk-based log 400 in accordance with the invention. As noted, a portion of the disk array 135 is organized as the log 400. In the illustrative embodiment, the log consumes approximately 5% of the disk array 135, although other percentages of log consumption may be advantageously used with the present invention. It should be noted that log consumption will typically not be limited by the cost of disk storage space, but by the cost of maintaining the index 800 used to describe the log. The disk-based log 400 illustratively incorporates a segment/stripe/region topology similar to that of the home location array 300. That is, each disk 130 of the log 400 is partitioned into disjoint log segments 500, wherein log segments on different disks 130 are organized into stripes 420 and wherein stripes 420 adjacent to one another are organized into regions 430. Note also that the log 400 does not necessarily reside on a "lower" portion of the disk array 135, but may reside on another portion of the array 135 and, alternatively, may even be interspersed among the regions 330 of the home location array 300.

Figure 5:
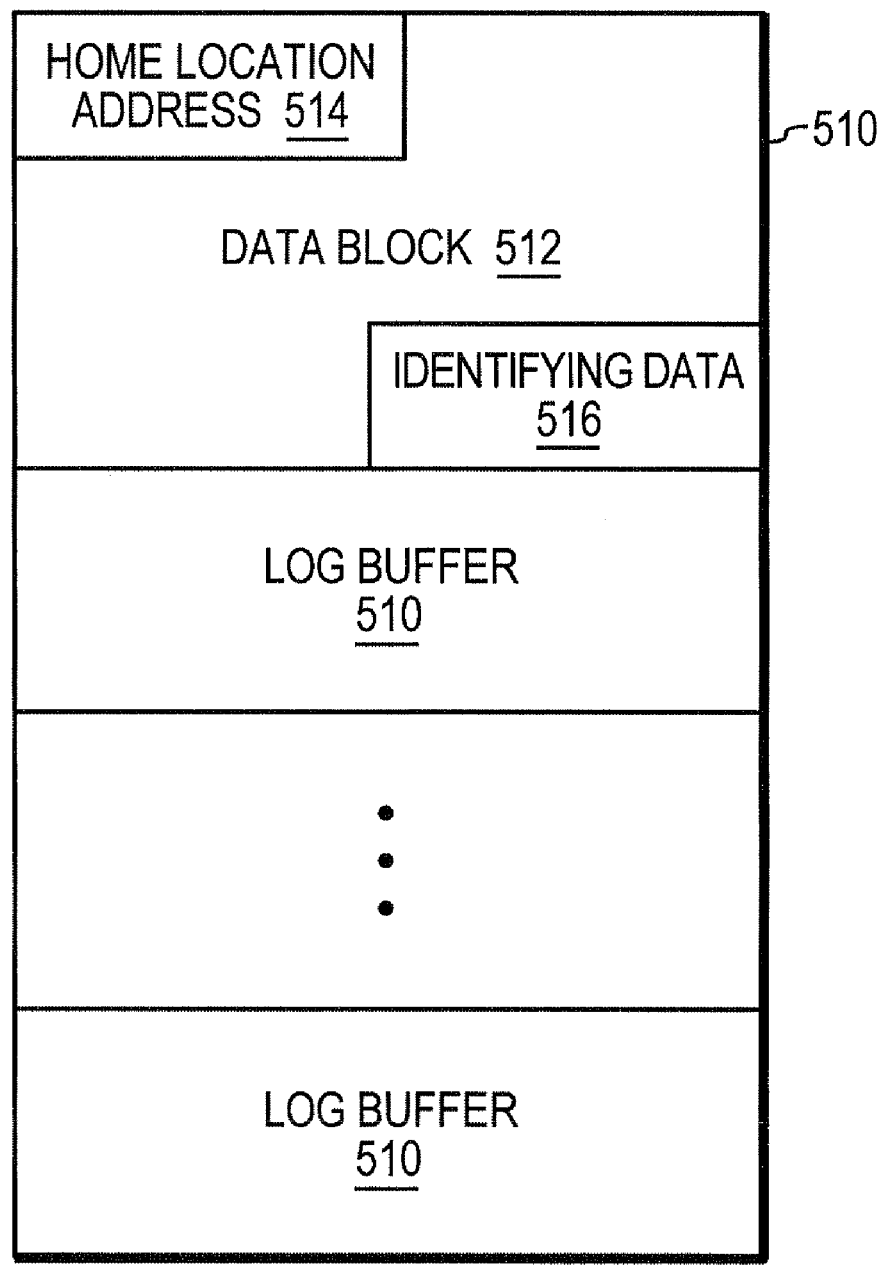
FIG. 5 is a schematic block diagram illustrating organization of a log segment in accordance with the present invention.

FIG. 5 is a schematic block diagram illustrating organization of a log segment 500 in accordance with the present invention. In an illustrative embodiment, each log segment 500 resides on a disk 130 and comprises a set of log buffers, e.g., 64 log buffers 510, wherein each log buffer comprises a data block 512 and a corresponding address 514. That is, each log buffer 510 stores a 4 kB block of data (data block 512) that is associated with a 32-bit home location address 514. In addition to storing data, each log buffer 510 also contains information that describes or identifies the data (e.g., 4 bytes of identifying data 516). The identifying data 516 of each log buffer 510 is used during the sort procedure to, e.g., identify a locality set associated with the log buffer, thereby obviating the need for a memory ("in core") data structure that maps log addresses to home locations. As a result, the log segments 500 are slightly larger than the home location segments 310.

As used herein, a "homed" data block is a data block that is stored in the home location array 300. A "logged" data block is a data block that is stored in the disk-based log 400 and whose data has not yet been moved back to its home block location in the home location array. Thus, each log segment 500 contains a set of logged data blocks 512 (together with identifying data 516) with known locality. For example, a write request that updates a homed data block with a new write data block is a logged data block in the log until that data block is moved to the home location array. The index 800 reflects that there is an update to the homed data block that is held in the log 400 so that, if a subsequent read request is directed to that data block, the read request is serviced from the disk-based log 400 instead of the home location array 300. A logged data block could also be a new data block that has yet to be written to its home block location in the array.

Write Buffer

As also used herein, an active log segment is an "in core"(in memory) representation of a log segment 500 that is actively written by the log manager 900 for updates (write data) of incoming write requests received at the storage system 120. As a result, each active log segment comprises 64 log buffers, wherein each log buffer includes a 4 kB block of data and 4 B of identifying data. These active log segments are generally preassigned to locations in the disk-based log 400, i.e., have corresponding log segment addresses. The active log segments illustratively reside in an intermediate staging area of the storage system that is embodied as write buffer 600.

Figure 6:
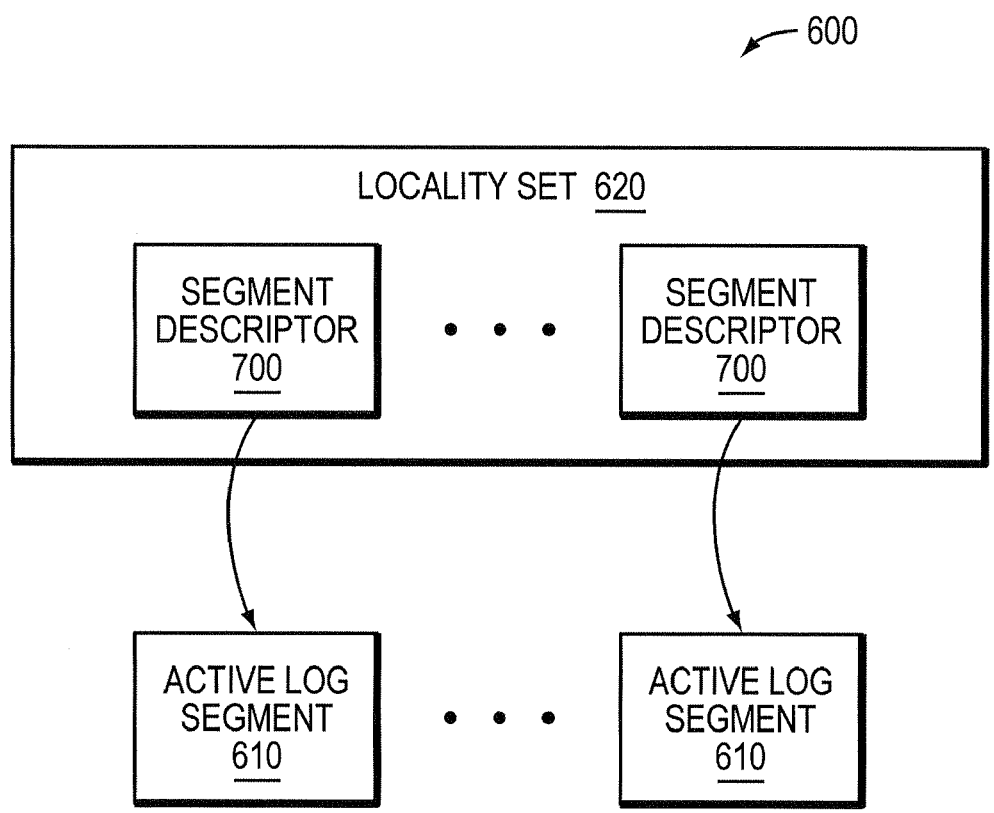
FIG. 6 is a schematic block diagram illustrating organization of a write buffer in accordance with the present invention.

FIG. 6 is a schematic block diagram illustrating the organization of the write buffer 600 in accordance with the present invention. In an illustrative embodiment, the write buffer 600 is organized into memory data structures that are used by the log manager 900 to manage the disk-based log 400. Each memory data structure functions as a segment descriptor 700 that references (points to) an active log segment 610 created in the write buffer 600 and that represents a corresponding log segment 500 of the log 400. A plurality of segment descriptors 700 is organized as a locality set 620 that, according to the invention, identify all log segments that share localities.

A sequential block address range can be decomposed into a set of subranges called "localities". As used herein, localities are disjoint, sequential subranges of the block address range, and the union of all localities derived from a block address range is the original block address range. Since subranges are themselves address ranges, this process can be recursive, with each level of recursion decreasing the size of the address range and increasing the locality of blocks addressed. A set of blocks within an address range can then be partitioned into corresponding "locality sets", where all block addresses within a locality set are contained within the same locality.

Operationally, localities can be conveniently defined via mathematical computations. A 32-bit address range, for example, can be decomposed into 256 localities by dividing the address by 224 and using the result to identify a locality. Equivalently, a 32-bit address range can be decomposed into 256 localities by using the high-order byte of the address to identify the locality. In an illustrative embodiment described herein, 256 segment descriptors are grouped into a locality set 620, which identifies all log segments that share localities, e.g., each segment contains disk blocks that have the same first and second high-order bytes of their home location addresses. Yet, the log segments of a locality set may also have differing localities, e.g., each segment may contain disk blocks that have the same first high-order byte of their home location addresses, but that have different second high-order bytes of those addresses.

Figure 7:
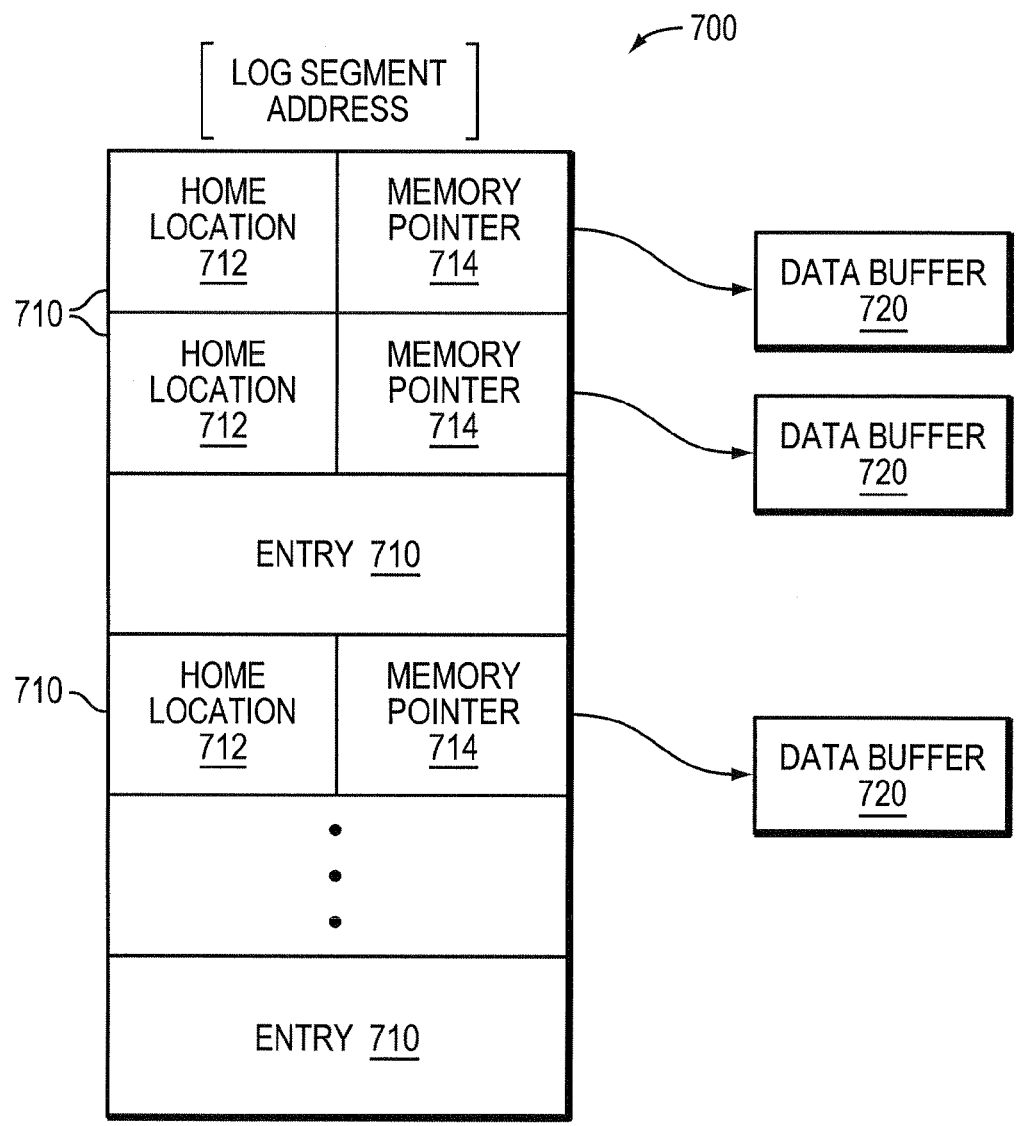
FIG. 7 is a schematic block diagram illustrating organization of a segment descriptor in accordance with the present invention.

FIG. 7 is a schematic block diagram illustrating the organization of a segment descriptor 700 in accordance with the present invention. The segment descriptor is illustratively embodied as an array having a plurality of (e.g., 64) entries 710, wherein each entry comprises a home location 712 and a memory pointer 714 that references a data buffer 720, e.g., a 4 kB block of data, in the write buffer 600. The content of the home location 712 illustratively comprises the combination of a home location address (e.g., home location address 514) of a data block (e.g., data block 512) and an identifier (e.g., identifying data 516) for the block. As noted, each segment descriptor 700 of a locality set 620 points to an active log segment 610 in the write buffer 600 that represents a corresponding log segment 500 of the log; accordingly, the segment descriptor has an associated (log segment) address of the corresponding log segment in the log 400. The segment descriptors 700 are used in connection with the novel sorting procedure described further herein.

Since the size of each active log segment 610 is approximately 256 kB (sixty-four 4 kB log buffers) and since there are 256 active log segments in a locality set 620, the write buffer 600 illustratively comprises at least 64 MB of storage space in the non-volatile memory 140. In other words, a portion of the non-volatile memory, e.g., 64 MB, is used as the write buffer to temporarily hold (stage) the write data as it arrives at the storage system, before it is written to the log 400. Data written to the active log segments 610 is not moved from the write buffer 600 to the disk-based log 400 until the segments are full. To prepare for the final return of the data to their home locations in array 300, the log manager 900 illustratively processes collections of segments 610 to establish a first level of shared locality and then further processes those segments into new segments with a second, higher level of locality, as described further herein in accordance with the novel multi-level sorting procedure. It should be noted that the write buffer 600 may be up to twice as large in order to allow continued writes to locality sets after the associated active log segment has filled, but before the segment has been written to disk.

Index

Figure 8:
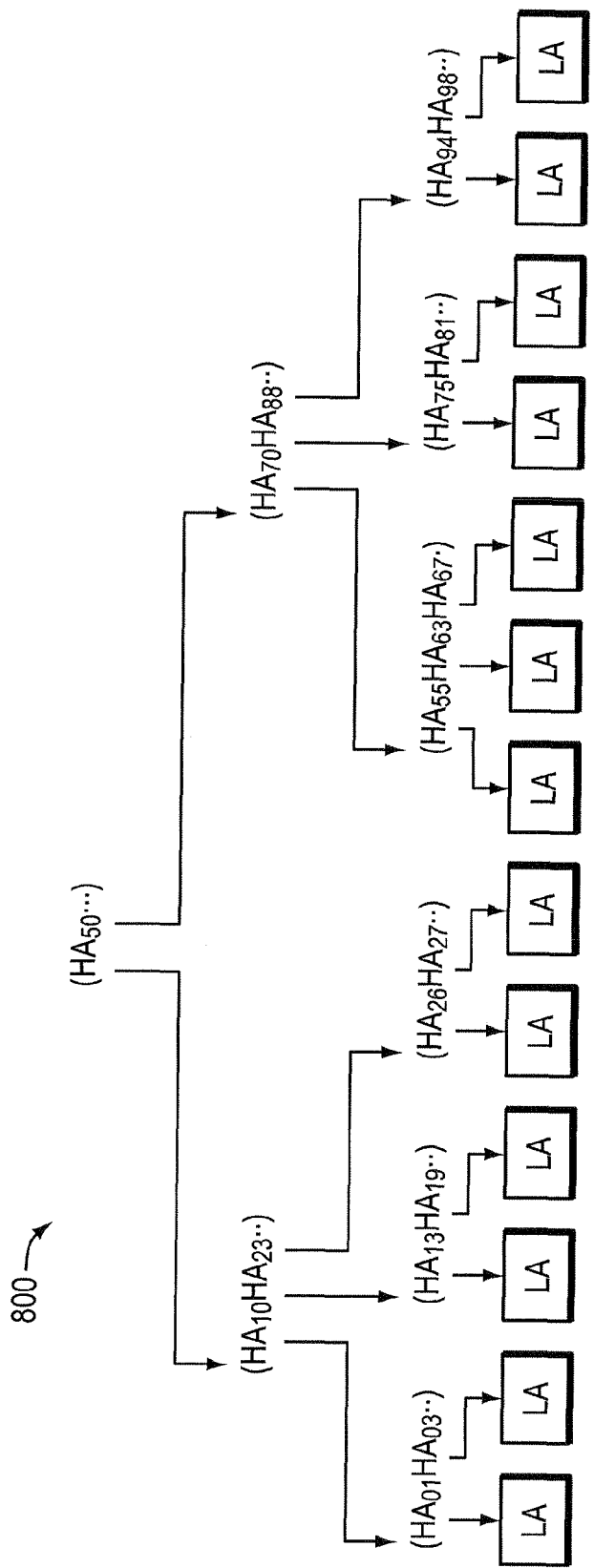
FIG. 8 is a schematic block diagram illustrating organization of an index in accordance with the present invention.

FIG. 8 is a schematic block diagram illustrating organization of the index 800 in accordance with the present invention. The index 800 is illustratively embodied as a sorted data structure, such as a hash table or, as described herein, a balanced tree (B-tree), in the non-volatile memory 140 and is configured to provide mappings from home addresses (HA) on the home location array 300 to log buffer addresses (log addresses, LA) on the disk-based log 400. Upon receiving a write request, the log manager 900 stores the write data associated with the request in an active log segment 610 of the write buffer 600 and records its log address (LA) in the B-tree indexed by the home address (HA) specified in the request. The home address (HA) is therefore used as a key to index into the B-tree. If another write request arrives for the same home address, a new log address is assigned and the B-tree mapping is updated. Here, the B-tree is traversed using the same home address as the key and the "old" log address is updated to a "new" log address.

Upon receiving a read request at the storage system, the log manager 900 consults the B-tree index 800 to determine whether there are any logged data blocks (i.e., logged data) pertaining to the request. That is, all incoming read requests are directed to the index 800 of the non-volatile memory 140 to determine whether the data in the home location array is valid. If so, the data is read from the home location array 300. Otherwise, the data (i.e., the logged data) is read from the disk-based log 400. This aspect of the invention is concerned with correctness of the data and the desire to find the most recently written data. As described herein, the storage system 120 may choose to rehome data as a side effect of a read request.

Disk-Based Sort Procedure

In accordance with another aspect of the invention, a novel disk-based multi-level sort procedure is provided to establish locality among updates (write data) held in the disk-based log, thereby enabling the write data to be efficiently written to home locations on the disk array. As the write data is received, the log manager 900 of the storage system temporarily stores the data efficiently on the disk-based log 400. As more write data arrives, the log manager sorts the data in the log in accordance with the multi-level sort procedure, thus increasing the locality of data when stored on the home location array 300. When the log approaches capacity, the log manager writes the sorted data to their home addresses on the array with high locality and performance.

Figure 9:
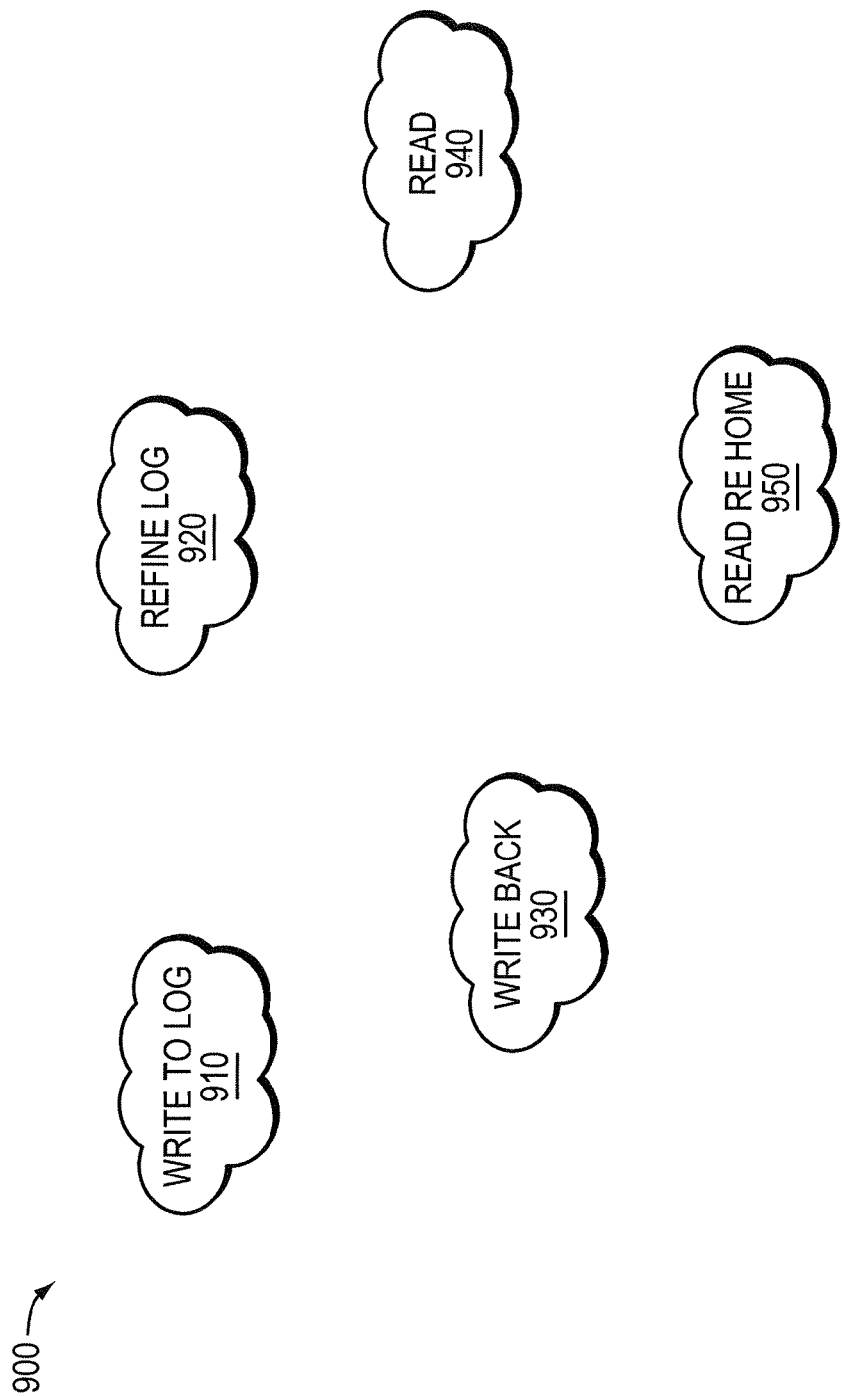
FIG. 9 is a schematic block diagram illustrating various processes of a log manager in accordance with the present invention.

FIG. 9 is a schematic block diagram illustrating various processes of the log manager 900 in accordance with the present invention. In the illustrative embodiment, the log manager comprises five processes: WriteToLog 910, RefineLog 920, WriteBack 930, Read 940 and ReadReHome 950. The WriteToLog process 910 is invoked by the log manager 900 to accept incoming requests to write new data to home addresses in the home location array 300. To that end, the WriteToLog process 910 maintains 256 active log segments 610, each of which can store 64 log buffers (data blocks).

Specifically, as each incoming write request issued by a client 110 arrives at the write buffer 600, the log manager 900 assigns the write data of the request to a data buffer 720 and then invokes the novel multi-level sort procedure to sort the data into the active log segments 610 by a first address range level, e.g., the first high-order byte of its home location address 514. That is, based on the first high-order byte of the address, the log manager 900 selects a segment descriptor 700 and inserts the incoming write request into an available entry 710. The log manager 900 then inserts the home location address of the write request into the home location field 712 of the entry 710 and sets the memory pointer 714 to the write buffer address of the data buffer 720.

As noted, the segment descriptor 700 has a corresponding "base" log segment address; the log address that is mapped to a particular home location address is that base log segment address plus an offset reflecting the position of the entry 710 within the segment descriptor. For example, assume the log segment address of the segment descriptor is "100" and the incoming write request is assigned to the entry "5" of the segment descriptor. Accordingly, the log address that is mapped to the home location address is "105". The log manager 900 records the mapping from home location address to log address in the index 800 by performing, e.g., an "insert B-tree" operation that inserts log address 105 into a B-tree leaf mapped to the home location address of the incoming write request. The log manager 900 then generates a successful acknowledgement to the write request that is returned to the client 110.

When an active log segment 610 fills (as manifested by completed entries 710 of the corresponding segment descriptor 700), the WriteToLog process 910 flushes the segment to the disk-based log 400 and informs the log manager 900 that a new segment has been added to the first address range, e.g., 1-byte, locality set 620 corresponding to the high-order byte of the address. That is, the WriteToLog process 910 cooperates with the disk driver layer 230 to convert the entries 710 to "scatter-gather" I/O operations, e.g., disk write operations, which include the home location addresses 514 of the write data in the data buffers 720. The data is thus written to a corresponding log segment 500 on the disk-based log 400. The WriteToLog process 910 then notifies the log manager 900 that the log segment has been added to a 256 member locality set 620 (maintained in write buffer 600) based on the high-order byte of the home location address 514. The log manager 900 allocates a new active log segment, e.g., having a new corresponding log segment address (to replace the "old" log segment flushed to log) from a "free" active log segment pool so that it may continue retiring new incoming write requests received from the clients.

The RefineLog process 920 is invoked by the log manager 900 to further refine the data of the first address range locality sets 620 in accordance with the novel multi-level sort procedure. When a predetermined number (e.g., 256 or more) of log segments is populated into a first address range, e.g., 1-byte, locality set, a plurality (e.g., 256) of those segments may be loaded, e.g., from the log 400, into a repartitioning buffer (not shown) and processed (i.e., sorted) in accordance with a second level of the sort procedure. Note that when sorting, the log manager 900 may retrieve the data blocks from the disk-based log 400 sequentially and not in any particular order. Since each log buffer 510 is associated with a home location address 514 and since each log buffer also contains identifying information 516 (such as identification of the locality set 620), an additional memory data structure is not needed to provide mappings from log buffers to home addresses.

In an illustrative embodiment, the 256 log segments are loaded into the repartitioning buffer and a compare operation is performed for each log address of a logged block (or log buffer) with its associated log address in the index 800. If the addresses do not match, there has been an intervening write operation directed to that buffer, rendering the buffer stale, and the buffer is discarded. The remaining valid disk blocks (buffers) are partitioned into a plurality of (e.g., 256) locality sets, based on a second address range, e.g., the second high-order byte. Here, the second level of the multi-level sort procedure is performed whereby blocks/buffers that share first and second address range localities, e.g., have matching upper 16 bits, of their home location addresses are loaded into appropriate ones of these locality sets. The resulting first and second address range, e.g., 2-byte, locality sets 620 thus share the two high-order bytes, and are thus constrained to lie within a 16-bit address space of the home location array 300. The partitioned buffers are assigned to log segments, written to the disk-based log 400, and their leaf entries in the index 800 are adjusted to reflect their new locations (i.e., the B-tree is updated). The old segments are thereafter released for re-use by the WriteToLog process 910, e.g., into a log segment pool, which is used by both the WriteToLog and RefineLog processes.

The WriteBack process 930 is invoked by the log manager 900 in response to one of two events: low space within the disk-based log 400 and/or low space within the index 800. Once triggered by an event, the WriteBack process 930 writes the data from the log 400 to the home location array 300. Illustratively, the WriteBack process 930 initially chooses the locality set 620 with the highest degree of locality (except in trivial cases, two bytes) and the highest number of log segments 500. However, the WriteBack process 930 may select the locality set with one byte of locality if there are none with two bytes. Note that there is always at least one locality set, e.g., between 1 and 256 locality sets, that share one byte of locality and that are input to the RefineLog process 920. That is, RefineLog 920 operates on one locality set at a time and, thus, reduces by one the number of these 1-byte locality sets at a time. Accordingly, there will always typically be a set of 1-byte locality sets for the WriteBack process 930 to "fall back" to, if necessary.

Illustratively, the WriteBack process 930 loads as many of these chosen disk blocks/buffers as possible into a writeback buffer (not shown). The log addresses of the disk blocks are compared with the mappings of the index 800 to assure validity. Stale data is discarded and the remaining set of blocks is forwarded to the disk storage layer 220 (e.g., the RAID system) to write efficiently to the disk array 135. Ideally, the Write-Back process 930 forwards (to the RAID system) disk blocks having addresses that share the two high-order bytes (e.g., 16 bits) of home location address space. Since the address space is layed out in regions 330 that have high locality, the RAID system is able to write the data out very efficiently. For example, a conventional RAID environment multiplies the random write load on a disk substantially, e.g., 4-6 times (×). The inventive technique described herein, however, can drive the amortized cost of a random write operation below mirroring (2×) and even below a typical random write (1×) to a single disk in a RAID protected array. Note that the data is essentially written "in-place" (as opposed to "anywhere") on disk. Once the log buffers/disk blocks are no longer in the log 400 but have been returned to their home disk locations, the log addresses of those buffers are removed from the index 800 and the log segments are returned to the log segment pool.

The Read process 940 is invoked by the log manager 900 to respond to incoming read requests. Each read request specifies a data block (e.g., a 4 kB block of data) to read. The Read process 940 uses the home location address of the requested block to index into the B-tree to thereby determine whether there is a corresponding log address. If the B-tree index 800 contains a mapping to a log address, the Read process 940 schedules a read operation, e.g., a disk read operation, to access the data from the log 400. If the index 800 does not contain a mapping for that disk address, the Read process 940 schedules a read operation to access the data from the home location array 300.

The ReadReHome process 950 is invoked by the log manager 900 when, during a sequential read, it is determined that a segment 310 or stripe 320 (in the home location array 300) has a large number of logged blocks. That is, when reading a sequence of home location addresses, the Read process 940 may identify a number of those addresses in the index 800. In such a case, it may be advantageous to return the blocks to their home locations prior to invocation of the WriteBack process 930. For example, assume a sequential read is defined as reading an entire segment 310 within a stripe 320. For purposes of the invention, if more than three (3) logged blocks are found during the sequential read, then ReadReHome 950 is invoked to return those blocks to the home location array 300. It should be noted, however, that other algorithms may be appropriate based on properties of the disk system and applicable workloads.

Accordingly, the ReadReHome process 950 is invoked to return those blocks to the home location array 300 before the WriteBack process is invoked. To that end, the ReadReHome process passes the necessary buffers to the RAID system to write the data to the home location array 300. When the write completes, the ReadReHome process 950 removes the corresponding mappings from the index 800. Note that once the mappings are removed from the index, if an attempt is made to subsequently invoke the WriteBack or RefineLog processes, those processes will discover that the log buffers are invalid and, thus, will ignore them.

Figure 10:
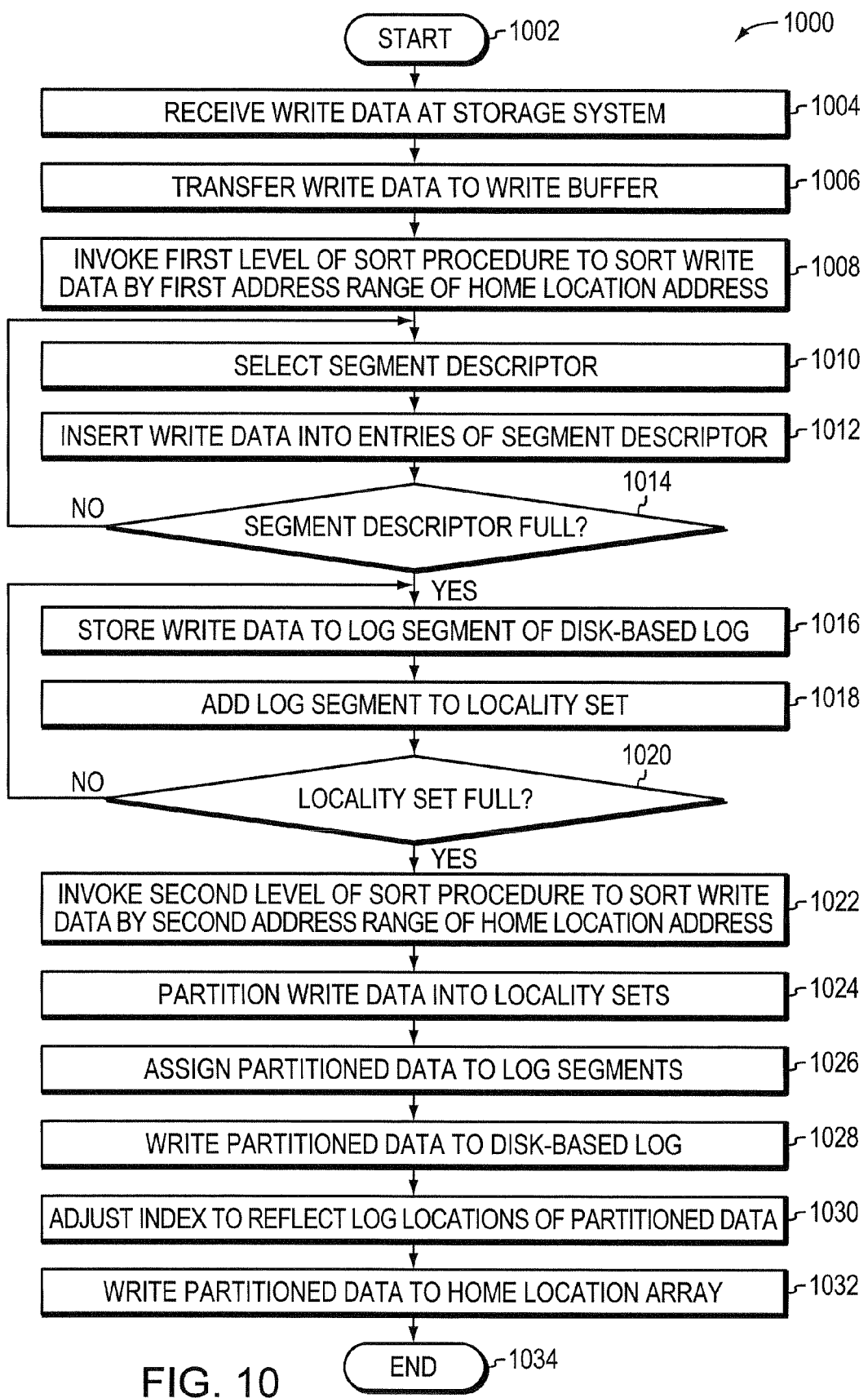
FIG. 10 is a flowchart illustrating a procedure for enhancing performance of updates to sequential block storage of a storage system in accordance with the present invention.

FIG. 10 is a flowchart illustrating a procedure for enhancing performance of updates to sequential block storage of a storage system in accordance with the present invention. The procedure 1000 starts at Step 1002 and proceeds to Step 1004 where write data associated with write requests issued by one or more clients are received at the network adapter of the storage system and, in Step 1006, transferred to a staging area (write buffer) of the storage system. In Step 1008, the log manager invokes the first level of the novel multi-level sort procedure to sort the data by a first address range, e.g., the first high-order byte, of their home location addresses. Based on the first high-order byte of the address, the log manager selects a segment descriptor in Step 1010 and inserts the in-coming write data into available entries of the descriptor in Step 1012.

In Step 1014, a determination is made as to whether the segment descriptor is full. If not, the procedure returns to Step 1010. However, if the segment descriptor is full, the procedure proceeds to Step 1016 where the WriteToLog process flushes (stores) the data of the segment descriptor to a corresponding log segment on the disk-based log and, in Step 1018, informs the log manager that a new segment has been added to a 1-byte locality set corresponding to the high-order byte of the address. In Step 1020, a determination is made as to whether the 1-byte locality set is full, i.e., with a predetermined number of log segments. If not, the procedure returns to Step 1016.

Otherwise, the procedure proceeds to Step 1022 where the RefineLog process invokes the second level of the novel multi-level sort procedure to sort the data in the segments by a second address range, e.g., the second high-order byte, of their home location addresses. In Step 1024, the data in the log segments are partitioned into further locality sets based on the second high-order byte. In Step 1026, the partitioned data are assigned to log segments and, in Step 1028, are written to the disk-based log. In Step 1030, the index is adjusted to reflect the new log locations of the data. In Step 1032, the WriteBack process is triggered to write the data from the log to the home location array. The procedure then ends at Step 1034.

Advantageously, the present invention eliminates the cost associated with maintaining large write buffers in a storage system by providing a disk-based log. The invention further employs a disk-based sorting procedure that sorts blocks of data held in the log prior to returning them to their home locations, thereby substantially improving locality of disk access and, therefore, disk update performance efficiency compared to conventional static disk arrays. Note that a goal of the invention is to achieve sufficient locality to enable write back of data to individual stripes 320 of the home location array 300 with high locality. The illustrative disk-based sort procedure having two address range levels of sorting and one or more triggers for write back of data from the disk-based log 400 to the home location array 300 achieves this goal.

While there have been shown and described illustrative embodiments for enhancing performance of updates to sequential block storage of a storage system, it is to be understood that various other adaptations and modifications may be made within the spirit and scope of the present invention. For example, in an illustrative embodiment described herein, the disk-based log is implemented on disks of the disk array. However, in alternative embodiments of the invention, the log may be implemented in other technologies as long as the implementation is economical. Note that a key insight of the invention involves gathering up enough locality among the disk blocks so that write-in-place on the home location array is substantially efficient.

In addition, it should be noted that the performance benefit of write buffering increases with the size of the write buffer, but due to the physical characteristics of disks, the benefit is not uniform. To transfer a set of blocks stored on different disk tracks, the disk must seek between each transfer. In practice, this limits the number of transfers that can be achieved per disk revolution to three or four. When transfers are dense enough that several transfers can be scheduled against a single track, however, such physical limits disappear, and a disk can transfer as many blocks in a revolution as there are blocks in a track. It is, therefore, particularly advantageous to be able to buffer enough random write operations (writes) to achieve an average transfer density of five or more disk blocks per disk track.

According to the present invention, segment sizes can be chosen so that writes to a single segment always lie within a single disk track. With dual parity RAID, each random write implies three disk read operations (reads) and three disk writes to a single stripe. If the log is large enough to contain two buffered writes per segment, the average number of disk operations per segment across a stripe will be approximately six. With a segment size of 512 kB and a block size of 4 kB, this density can be achieved with 8 kB of log storage per segment, implying log storage of 1.5% of disk storage space. Beyond that point, write performance is proportional to log size for a broad range of log sizes. The point at which performance increases linearly with log size will generally depend on the level of data protection, the size of disk tracks, and the size of data blocks.

Notably, the novel disk-based log described herein makes such a large write buffer feasible. A log of 1.5% disk space stored in non-volatile memory would more than double the cost of the storage system, thus eliminating any price-performance advantage gained by improved disk performance.

The foregoing description has been directed to specific embodiments of this invention. It will be apparent, however, that other variations and modifications may be made to the described embodiments, with the attainment of some or all of their advantages. For instance, it is expressly contemplated that the processes and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for enhancing performance of updates to sequential block storage of a storage system, the method comprising:
   transferring the updates received at a network adapter of the storage system to a write buffer of the storage system, the updates comprising write data;
   invoking a first level of a multi-level sort procedure to sort the write data by a first set of one or more bits of a home location address of the write data, wherein the home location address corresponds to one or more storage locations on one or more storage devices where the write data is to be stored;
   storing the sorted write data to a first level locality set on a log;
   invoking a second level of the multi-level sort procedure to further sort the sorted write data of the first level locality set by a second set of one or more bits of the home location address that corresponds to the one or more storage locations on the one or more storage devices where the write data is to be stored;
   storing the further sorted write data to a second level locality set on the log; and
   invoking at least one event to trigger write back of the further sorted data from the log to a home location array of the storage system.

2. The method of claim 1, wherein the log is a disk-based log.

3. The method of claim 2, further comprising:
   a disk array having a first portion organized as the home location array and a second portion organized as the disk-based log.

4. The method of claim 3, wherein the disk array is organized as one or more Redundancy Array of Independent Disks (RAID) groups.

5. The method of claim 1, wherein the home location array includes a set of sequential home locations for storage blocks.

6. The method of claim 1, wherein the log stores versions of storage blocks that have yet to be returned to their home locations in the home location array.

7. The method of claim 1, wherein the first set of one or more bits of the home location address is a first high-order byte of the home location address and wherein the second set of one or more bits of the home location address is a second high-order byte of the home location address.

8. An apparatus configured to enhance performance of updates to sequential storage blocks of a storage system, the apparatus comprising:
   means for transferring the updates received at the storage system, comprising a processor and a memory, to a write buffer of the storage system, the updates comprising write data;
   means for invoking a first level of a multi-level sort procedure to sort the write data by a first set of one or more bits of a home location address of the write data, wherein the home location address corresponds to one or more storage locations on one or more storage devices where the write data is to be stored;
   means for storing the sorted write data to a first level locality set on a log;
   means for invoking a second level of the multi-level sort procedure to further sort the sorted write data of the first level locality set by a second set of one or more bits of the home location address that corresponds to the one or more storage locations on the one or more storage devices where the write data is to be stored;
   means for storing the further sorted write data to a second level locality set on the log; and
   means for invoking at least one event to trigger write back of the further sorted data from the log to a home location array of the storage system.

9. The apparatus of claim 8, wherein the log is a disk-based log.

10. The apparatus of claim 9, further comprising:
    means for organizing a disk array having a first portion as the home location array and a second portion as the disk-based log.

11. The apparatus of claim 10, wherein the disk array is organized as one or more Redundancy Array of Independent Disks (RAID) groups.

12. The apparatus of claim 8, wherein the home location array includes a set of sequential home locations for storage blocks.

13. The apparatus of claim 8, wherein the log stores versions of storage blocks that have yet to be returned to their home locations in the home location array.

14. The apparatus of claim 8, wherein the first set of one or more bits of the home location address is a first high-order byte of the home location address and wherein the second set of one or more bits of the home location address is a second high-order byte of the home location address.

15. A non-transitory computer readable medium containing executable program instructions executed by a processor, comprising:
    program instructions that transfer updates received at a storage system, comprising a memory, to a write buffer of the storage system, the updates comprising write data;
    program instructions that invoke a first level of a multi-level sort procedure to sort the write data by a first set of one or more bits of a home location address of the write data, wherein the home location address corresponds to one or more storage locations on one or more storage devices where the write data is to be stored;

program instructions that store the sorted write data to a first level locality set on a log;

program instructions that invoke a second level of the multi-level sort procedure to further sort the sorted write data of the first level locality set by a second set of one or more bits of the home location address that corresponds to the one or more storage locations on the one or more storage devices where the write data is to be stored;

program instructions that store the further sorted write data to a second level locality set on the log; and program instructions that invoke at least one event to trigger write back of the further sorted data from the log to a home location array of the storage system.

16. The non-transitory computer readable medium of claim 15, further comprising:

program instructions that organize a disk array as having a first portion as the home location array and a second portion as the log.

17. The non-transitory computer readable medium of claim 15, wherein the first set of one or more bits of the home location address is a first high-order byte of the home location address and wherein the second set of one or more bits of the home location address is a second high-order byte of the home location address.

18. A system configured to enhance performance of updates to sequential block storage of a storage system having a processor and a memory, the system comprising:

an array of the storage system, the array organized into a home location array having a set of sequential home locations for storage blocks, the array further organized into a log having a set of log buffers configured to store versions of storage blocks that have yet to be returned to their home locations in the home location array;

a non-volatile memory of the storage system organized as an index configured to provide efficient mappings, between home locations of the array and the log of the array, for storage blocks not yet returned to their home locations;

a write buffer of the storage system, organized into memory data structures used to manage the log, the write buffer configured to temporarily hold write data as it arrives at the storage system before it is written to the log;

each memory data structure to function as a segment descriptor that references an active log segment in the write buffer, the active log segment representing a corresponding log segment of the log; and a plurality of segment descriptors organized as a locality set that identifies log segments that share localities having a similar address range wherein the address range is a first and a second high-order bytes of the home location addresses.

19. The system of claim 18, wherein the log is a disk-based log.

20. The system of claim 18, wherein the array is organized as one or more Redundancy Array of Independent Disks (RAID) groups.

* * * * *